United States Patent [19]

Harvey et al.

[11] 4,245,156
[45] Jan. 13, 1981

[54] APPARATUS FOR MONITORING THE OPTICAL QUALITY OF A BEAM RADIATION

[75] Inventors: James E. Harvey, Albuquerque, N. Mex.; John H. Bluege, Lake Park, Fla.

[73] Assignee: United Technologies Corporation, Hartford, Conn.

[21] Appl. No.: 973,192

[22] Filed: Dec. 26, 1978

[51] Int. Cl.³ .............................................. G01D 5/36
[52] U.S. Cl. .................................. 250/233; 250/203 R
[58] Field of Search .................. 250/201, 203 R, 204, 250/232, 233; 356/141, 152

[56] References Cited
U.S. PATENT DOCUMENTS

| | | | |
|---|---|---|---|
| 3,090,869 | 5/1963 | Astheimer . | |
| 3,307,038 | 2/1967 | Schmutz . | |
| 3,348,050 | 10/1967 | Bez ........................ | 250/203 |
| 3,500,050 | 3/1970 | Hillman . | |
| 3,537,793 | 11/1970 | Shaffer . | |
| 3,539,814 | 11/1970 | Lillestrand et al. ................. | 250/203 |
| 3,614,239 | 10/1971 | Kissel ..................... | 356/152 |
| 3,950,099 | 4/1976 | Malueg . | |
| 3,967,110 | 6/1976 | Rogers et al. ....................... | 250/201 |

*Primary Examiner*—David C. Nelms
*Attorney, Agent, or Firm*—Lawrence A. Cavanaugh

[57] ABSTRACT

An improved apparatus for monitoring the optical quality of a beam of coherent radiation or an image from an incoherent source is disclosed. The apparatus includes a disk capable of being rotated and having a plurality of rings of slit sets radially disposed within the disk symmetrically about a central axis at a plurality of radial positions wherein each ring of slit sets includes a plurality of slit sets, symmetrically disposed about the ring, each adapted for passing a focused beam of radiation therethrough. A suitable beam steering mechanism such as an adjustable mirror is adapted for directing focused radiation from a first ring to a second ring for varying the intensity of the radiation passing through the slits to detector means for improved signal processing and for varying the parameters of the slits passing the radiation for optimizing the measurement of various beam parameters for determining the optical quality of the radiation. Detector means positioned behind the disk in optical line-of-sight communication with the adjustable mirror through the slits in the plurality of slit sets in each ring are adapted for providing data signals which when combined with synchronization signals, passing through the same slit as the radiation producing the data signal, results in error signals proportional to beam jitter, defocus and astigmatism. The apparatus is adapted for measuring quickly the optical quality of a beam having a signal-to-noise ratio variable between a low and a high value.

13 Claims, 18 Drawing Figures

APPARATUS FOR MONITORING THE OPTICAL QUALITY OF A BEAM RADIATION

CROSS REFERENCE TO RELATED APPLICATIONS

The subject matter hereof is also disclosed, and some of it claimed in copending U.S. patent application entitled "Optical Beam Monitor" Ser. No. 973,338 filed on even date herewith by D. F. Cornwell and held with the present application by a common assignee.

BACKGROUND OF THE INVENTION

This invention relates to a beam quality detector system and more particularly to a system utilizing a single image detector.

Image motion detectors capable of tracking the trajectory of a plane or other moving objects, utilizing radiation emanating therefrom, are known in the art. Typically, radiation emanating from a moving body is continuously focused onto a rotating chopper or scanning disk which includes alternate zones of different transparency to the incident rays which modulate the intensity of the rays passing through the rotating disk according to the coordinate position of the alternate zones in the image field. The modulated intensity is detected by optical means which generate amplitude and frequency information proportional to the coordinates of the image point on the disk.

Schmutz in U.S. Pat. No. 3,307,038 discloses a rotating chopper disk adapted for periodically interrupting the passage of radiation from a search object to a detector. The rotating disk has an outer circular ringshaped track having the form of a radial gap pattern which is periodic in the circular direction of the track movement and which repeats itself in sequential sector-forming sections. A dividing line extending diagonally across the sector-forming sections divides the sector-forming section into two fields wherein the radial gap pattern in each field is different. Motion of the image across the dividing line results in a frequency variation in an output signal from the detector which is analyzed by means well known in the art to determine the direction of the motion of the search object.

Astheimer in U.S. Pat. No. 3,090,869 discloses a motion detector device which utilizes a reticle in the form of a drum or a disk. The reticle includes bands of opaque bars and clear bars interspersed with one another wherein the bands are disposed at an angle of forty-five degrees to the reticle travel direction and at right angles to one another. On the outer edge of the reticle are provided two sets of phase reference patterns for elevation phase and azimuth phase references. The error signal is developed with respect to the two orthogonally disposed bands which produce frequency and phase variations porportional to the radial and azimuthal motion of the image of the object being tracked.

Malueg in U.S. Pat. No. 3,950,099 discloses a two-axis image motion detector adapted for detecting two separate velocity channels through a single optical channel with a single photodetector. A single disk rotates at a substantially constant rotational speed and contains a pair of orthogonal grid patterns of different spatial frequencies. In the preferred embodiment each grid pattern is disposed at a forty-five degree angle with respect to a radial axis extending from the center of the disk through the grid pattern. An image focused on the grid pattern modulates the carrier frequencies determined by the grid patterns thereby generating a composite output in a single photodetector representing the sum of the two image motion channels. Standard filtering and demodulating techniques are utilized to generate a DC voltage proportional to the image rate for each of the orthogonal axis.

Prior art devices are adapted for sensing the radial and azimuthal motions of an object but are not adapted for determining the optical quality of a beam of radiation. In particular, beam astigmatism and defocus measurements are not possible and the prior art devices are not adapted for providing error signals to a feedback circuit capable of minimizing the degradation of the optical quality of a beam due to beam jitter, astigmatism or defocus.

Cornwell in U.S. patent application Ser. No. 973,338 filed on even date herewith and held by a common assignee discloses an apparatus for monitoring the optical quality of a beam wherein the apparatus includes a disk, adapted for rotation about a central axis, having a plurality of slit sets symmetrically disposed circumferentially within the disk at a radial position wherein each slit set includes a first slit and a second slit disposed in an orthogonal relationship to one another and symmetrically disposed about a radial axis extending from the plurality of slit sets to the central axis and a third slit disposed between the first slit and the second slit bisecting the angle therebetween and superimposed on he radius line. A synchronization source disposed proximate the front surface of the disk is adapted for providing a synchronization signal through the same slit through which the radiation is focused to provide timing signals for data reduction. Beam jitter is obtained from data provided by the first and second slits within a slit set, beam astigmatism is provided from data obtained from the first, second and third slits of a slit set and beam defocus information is obtained from data provided by the variable position of the minimum slit width portion of each slit set within a triplet group of slit sets.

Unfortunately a scanning disk with a plurality of slit sets circumferentially disposed about the scanning disk at a single radical position may suffer a compromise in performance if more than one optical measurement is required. This occurs when the optimum operating conditions for the measurement of a single parameter of the optical quality of a beam of radiation may require a different slit configuration and/or dimensions than the requirements for the measurement of a second parameter. This results in slit sets having a compromise configuration and/or dimensions suitable for use in measuring all of the parameters defining a combination of measurements of the optical quality which cannot yield optimum values for each parameter which may detract significantly from the achievable overall performance of the apparatus. Additionally the alternate measurement of the optical quality of beams having high and low signal-to-noise ratios would typically require changing the rotation rate of the disk. This requires a prohibitively long change time for many applications due to the inertia of the spinning disk to change in rotation rate.

SUMMARY OF THE INVENTION

A primary object of the present invention is to monitor the optical quality of a beam of radiation when the radiation is subject to varying physical conditions.

A further object of the present invention is to monitor the optical quality of a beam of radiation wherein the signal-to-noise ratio of the beam changes between a low value and a high value.

In accordance with the present invention an apparatus for monitoring the optical quality of a beam of radiation comprises a disk adapted for rotation about a central axis, means for rotating the disk about the central axis, a plurality of rings of slit sets radially disposed within the disk symmetrically about the central axis at a plurality of radial positions wherein each ring of slit sets comprises a plurality of slit sets symmetrically disposed circumferentially about the disk at each radial position wherein each slit set is adapted for passing a focused beam of radiation therethrough, means for focusing a beam of radiation through the slit sets, means for directing the radiation from one radial position on the disk to another radial position, detector means for sensing the radiation passing through each slit of a slit set to provide a data signal, means for providing a synchronization signal and means for monitoring the synchronization signal and the data signal to provide output signals proportional to beam quality and the amount and direction of beam motion.

A primary feature of the present invention is a disk adapted for rotation about a central axis having at least two rings of slit sets radially disposed within the disk. Additionally, the dimensions of the slits within the slit sets forming a ring at one radial position are different from the dimensions of the slits in each of the slit sets forming a ring at a second radial position. In one embodiment, the separation between slits and the separation between slit sets within a first ring at a first radial position are different than the separation between slits and the separation between slit sets in a second ring at a second radial position. In a further embodiment the number of slits within the slit sets forming the ring at a first radial position is different from the number of slits within the slit sets forming the ring at a second radial position. Additionally the width of the slits within the first ring is different from the width of the slits within the second ring. In the preferred embodiment the width of the slits at a radial position closest to the central axis is greater than the width of the slits forming the ring at a radial position furthest from the central axis. A further feature of the present invention is a variable step scan mirror adapted for directing the focused beam of radiation from one radial position on the disk to another radial position.

A primary adventure of the present invention is the ability to change the pulse repetition rate of the output signal without varying the rotational speed of the disk. Additionally the pulse widths of the output signal can be changed without changing the rotational speed of the disk for measurements of beam quality for radiation having low or high signal-to-noise ratios. The speed of making the measurements between high and low signal-to-noise rotation radiation is not limited by the inertia of the disk to changes in rotation speed. Additionally with variable geometry, slit width, spacing between slits, and spacing between slit sets obtainable between rings of slit sets, an optimum configuration for the measurement of each of the variables of beam quality such as beam jitter, beam astigmatism, and beam defocus can be obtained by utilizing an appropriate ring of slit sets within the disk.

The foregoing and other objects, features and advantages of the present invention will become more apparent in light of the following detailed description of a preferred embodiment thereof as discussed and illustrated in the accompanying drawing.

BRIEF DESCRIPTION OF THE DRAWINGS

FIG. 12 is a simplified schematic of typical focus patterns of radiation onto the disk; and FIGS. 13(a) and 13(b) are simplified representations of pulse trains as a function of focal position of the beam within the disk.

DESCRIPTION OF THE PREFERRED EMBODIMENT

The present invention is a device for optimizing the sensing of wave front distortions in coherent beams or image distortions of incoherent sources for beams of radiation having a variable signal-to-noise ratio. Additionally the present invention is adapted for providing variable measurements of the optical quality of a beam of radiation to enable optimization of the measurements of each of the parameters defining the optical quality such as beam jitter, astigmatism, and beam defocus. Also the present invention is adapted for obtaining the measurements of the optical quality of a beam of radiation wherein the beam has a signal-to-noise ratio variable from low to high.

Figure 1:
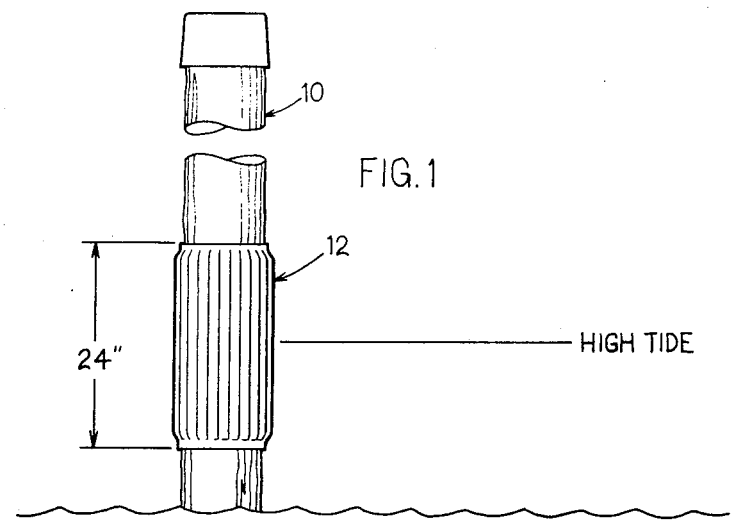
FIG. 1 is a simplified perspective view of an apparatus adapted for monitoring the optical quality of a beam of radiation having a variable signal-to-noise ratio.

Referring now to FIG. 1 which shows a simplified perspective view of the apparatus in accordance with the present invention. The apparatus includes a disk 20 having a finite axial thickness T with a first ring 22 of slit sets comprising a plurality of first slit sets 24 symmetrically disposed at a first radial position $R_1$ circumferentially about the disk, a second ring 26 of slit sets having a plurality of second slit sets 28 symmetrically disposed at a second radial position $R_2$ circumferentially about the disk, a drive rod 30 attached at one end to the center 32 of the disk and at the other end to a motor 34 adapted for rotating the disk at a desired frequency F, an optical system 36 adapted for focusing radiation through a slit within a ring of slit sets and for directing the focused radiation to respective rings of slit sets, i.e., between the first and second rings located at the first and second radial positions on the disk wherein said optical system includes focusing optics 38 adapted for focusing radiation 40 from a source (not shown) through a focus path 42 onto the disk and a turning mirror 44 adapted for movement from a first position A for directing the radiation to the first ring to a second position B for directing the radiation to the second ring, a first detector 46 disposed behind the disk in optical line-of-sight communication with the focusing optics 38 through slits within the first ring, a second detector 48 disposed behind the disk in optical line-of-sight communication with the focusing lens 38 through slits located within the second ring on the disk wherein the first and second detectors are adapted for receiving pulses or radiation passing through slits in the first and second rings to provide data signals, a first synchronization source 50 disposed proximate a front surface 52 of the disk and adapted for passing synchronization radiation 54 through the slits within the first ring to a first synchronization detector 56 positioned behind the disk in optical line-of-sight communication with the first synchronization source through the slits within the first ring, a second synchronization source 58 adapted for passing synchronization radiation through the slits within the second ring 26 to a second synchronization detector 60 disposed behind the disk in optical line-of-sight communication with the second synchronization source through the slits within the second ring, an analyzer 62 adapted for receiving the data signals from the first and second detectors and synchronization signals from the first and second synchronization detectors to provide error signals 63 to an error signal sensor 64 or to a feedback loop 66 (shown only in block form) which may include adaptive optics for manipulating the beam of radiation to minimize beam distortions, and an encoder 68 attached to the motor 34 for providing a clock signal to the analyzer which when combined with the synchronization signals provides timing pulses for data reduction of the data pulses.

Figure 2:
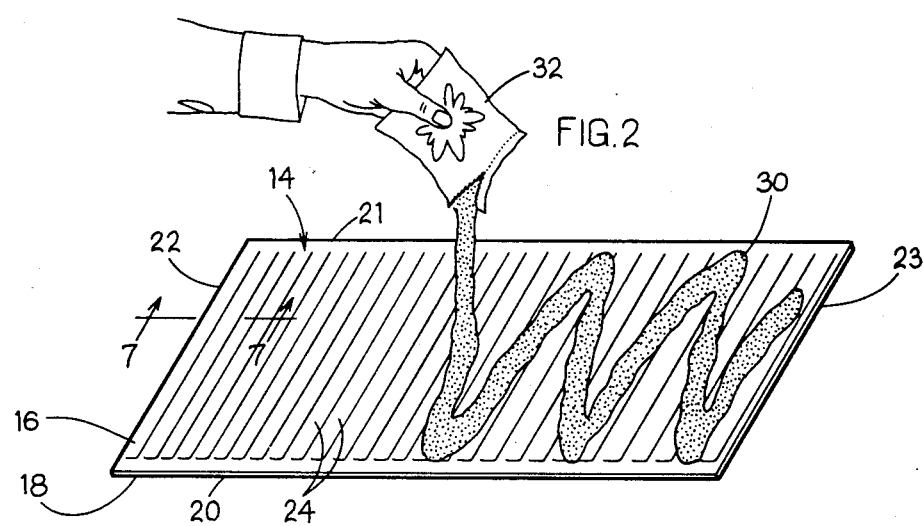
FIG. 2 is a frontal view of the apparatus as shown in FIG. 1.

Referring now to FIG. 2 which shows a front view of the disk 20 wherein the plurality of slit sets 24 defining the first ring 22 at the first radial position $R_1$ includes a first slit 70, a second slit 72 disposed in a substantially orthogonal relationship to the first slit wherein the first and second slits are symmetrically disposed about a radial line 74 extending from the slit set to the center 32 of the disk to which the drive rod 30 (not shown) is attached, and a third slit 76 symmetrically disposed between the first and second slit, bisecting the angle therebetween and superimposed on the radial line. Each of the slits has a length L greater than the maximum diameter of a focused volume of radiation passing therethrough and a minimum slit width as discussed hereinafter defined by resolution requirements of the measurement and the signal-to-noise ratio of the radiation being measured. As a general rule the lower the signal-to-noise ratio, the greater the slit width required to obtain the same resolution.

In a preferred embodiment of the present invention, the first ring 22 of slit sets is formed with a multiplicity of triplet groups 78 circumferentially and symmetrically disposed about the circumference of the first ring wherein each triplet group comprises a leading slit set 80, a middle slit set 82 circumferentially positioned adjacent the leading slit set and a trailing slit set 84 circumferentially positioned adjacent the middle slit set. The leading, middle and trailing slit sets are sequentially repeated within each of the triplet groups defining the first ring.

Figure 3:
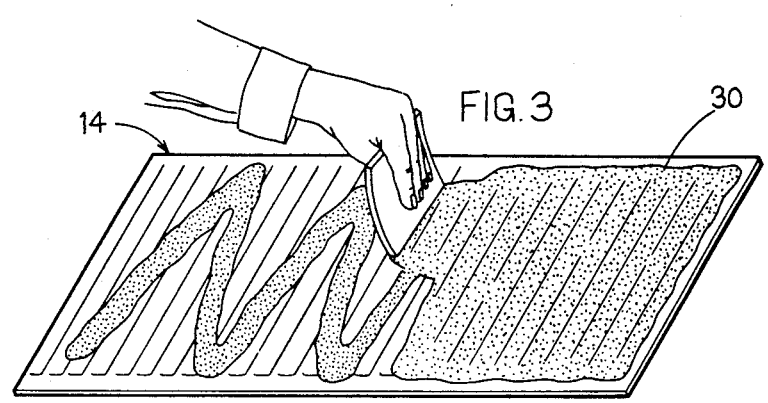
FIG. 3 is a cross-sectional view of the apparatus as shown in FIG. 2 in the 3—3 direction.

The first, second and third slits 70, 72 and 76, respectively of the leading slit set 80 each have a cross-sectional configuration in the 3—3 direction of FIG. 2 as shown in FIG. 3 wherein each slit of the first slit set is formed between knife edges 86 adjacent from the front surface 52. An exit passage 88 having a width much greater than the width of the slit set extends from the slit at the knife edge through a centerline plane 90 perpendicularly disposed to the rotation axis passing through the center 32 of the disk and centrally disposed within the thickness of the disk to a back surface 92 of the disk.

Figure 4:
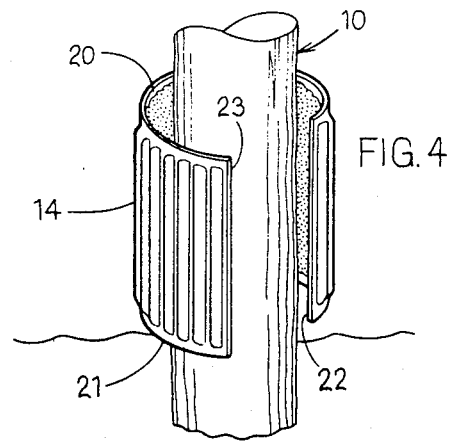
FIG. 4 is a cross-sectional view of the apparatus as shown in FIG. 2 in the 4—4 direction.

The first, second and third slits of the middle slit set 82 each have a cross-sectional configuration in the 4—4 direction of FIG. 2 as shown in FIG. 4 wherein each slit of the middle slit set is formed between knife edges 86 centrally disposed within the disk between the front surface 52 and the back surface 92. An entrance passage 94 extends from the front surface to the knife edge and the exit passage 88, for passing radiation therethrough, both having widths much greater than the width of the slit.

Figure 5:
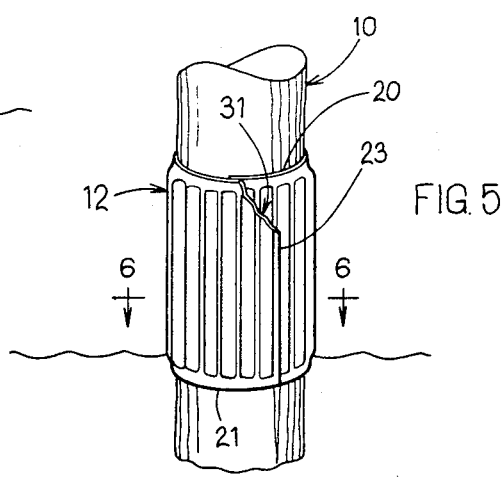
FIG. 5 is a cross-sectional view of the apparatus as shown in FIG. 2 in the 5—5 direction.

The first, second and third slits of the trailing slit set 84 each have a cross-sectional configuration in the 5—5 direction of FIG. 2 as shown in FIG. 5 wherein each slit of the trailing slit set is formed between knife edges 86 disposed proximate the back surface 92. The entrance passage 94 extending from the front surface to the slit is adapted for passing radiation through the disk to the slit. The width of the slit is much less than the width of the entrance passage. The variation in the position of the knife edges within the disk is sequentially repeated within each triplet group around the entire circumference of the first ring.

The second ring of slit sets 26 as shown in FIG. 2 is likewise formed with a multiplicity of triplet groups of slit sets in the same manner as the first ring 22. Each slit set within the triplet group has a knife edge slit sequentially disposed about the second ring essentially as shown in FIGS. 3, 4 and 5 in the same manner as hereinbefore described with respect to the first ring of slit sets. In the preferred embodiment the width of the slits within each slit set of the plurality of slit sets forming the second ring is greater than the width of the slits within the slit sets forming the first ring 26. Additionally, since the second ring of slit sets has a radius $R_2$ less than the radius $R_1$ of the first ring of slit sets, the spacing between slit sets within the second ring is less than the spacing between slit sets of the first ring. Additionally, the spacing between the slits of the slit sets within the first ring is typically greater than the spacing between the slits of the slit sets within the second ring. It is to be recognized that although FIG. 2 shows a second ring having slit sets comprised of a first, second and third slit, the slit sets within the second ring may be comprised of a first and second slit.

Referring now to both FIGS. 1 and 2, in operation radiation 40 from a source (not shown) is focused by the focusing lens 38 and directed by the turning mirror 44 to be incident onto the disk at a radial position for which slit sets can be rotated through the focus path 42. The operation of the present apparatus to obtain error signals utilizing information obtained by focusing the beam through the slits of the slit sets within either the first or second ring is explained by Cornwell in U.S.

patent application Ser. No. 973,338 filed on even date herewith and held with the present application by a common assignee.

Figure 6:
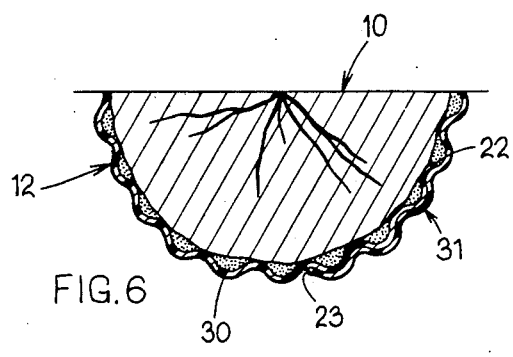
FIG. 6 is a modified and simplified view of the apparatus as shown in FIG. 2.
Figure 7:
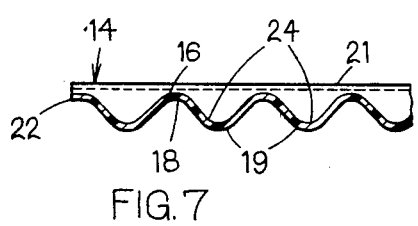
FIGS. 7A, 7B, 7C, 7D and 7E are schematic representations of pulse trains which are obtainable using the apparatus as shown in FIG. 6 in accordance with the present invention.

In accordance with the teachings of Cornwell the operation of the present invention for the determination of beam jitter is best described in conjunction with FIGS. 6 and 7. It is to be noted that the slits 150 and 152 shown in FIG. 6 have a decreasing separation therebetween with increasing radial position whereas the slits 70, 72 as shown in FIG. 2 have an increasing separation therebetween with increasing radial position in the disk. The description of the operation of the present invention is independent of the direction of increasing separation between slits. To simplify the explanation of the beam jitter measurement, only data obtained from the first and second slits 150, 152 as shown in FIG. 6 will be utilized. As radiation is incident onto the rotating disk at the radial position $R_1$ as shown in FIG. 1, a series of data pulses as shown in FIG. 7A is generated for each slit set as the slit sets rotate through the beam. Additionally timing pulses 176, generated by synchronization radiation from the first synchronization source 50, as shown in FIG. 1, passing through the first and second slits and the clock signal from the encoder 68, are processed to provide a desired positional relationship between the first and second data pulses 150A, 152A respectively and the timing pulse 176. As shown in FIG. 7A when the focused radiation is centered, the first and second data pulses are disposed substantially symmetrically about the timing pulses. Any variation in the width or position of the data pulses due to manufacturing tolerances of the slit, disk wobble and/or bearing runout is substantially compensated for, since the timing pulse 176 also includes error due to the same manufacturing tolerances, disk wobble and/or bearing runout. For a stationary beam the separation between data pulses 150A and 152A obtained from radiation passing through the first and second slits of each slit set remains substantially constant.

As the focused radiation moves in the negative radial direction, i.e., toward the center of the disk as shown by the arrow 178 in FIG. 6, the separation between the data pulses 150A and 152A as shown in FIG. 7B, becomes greater. The amount of the increase in separation between data pulses is proportional to the magnitude of the negative radial movement of the focal radiation. In like manner, as the focused radiation moves in the positive radial direction, the separation between data pulses decreases as shown in FIG. 7C.

Motion of the focused spot in the positive or negative azimuthal direction as shown by the arrows 180 in FIG. 6 is determined by analyzing the relative motion of the first and second data pulses with respect to the timing pulses 176. Positive azimuthal motion, i.e., motion in the direction of the disk rotation, of the focused radiation results in a shifting to the left as shown in FIG. 7D of the relative position of the first and second data pulses with respect to the timing pulses, whereas negative azimuthal motion of the focused radiation will produce a shifting to the right as shown in FIG. 7E of the relative position of the data pulses and the timing pulses. It is to be recognized that the direction of shift of the relative position will depend upon the direction of rotation of the disk as well as the relative position of the synchronization source with respect to a slit set, i.e., providing synchronous radiation through a slit before or after the radiation from the source passes through the slit. The separation between the first and second data pulses will remain essentially constant for purely azimuthal movement as shown in FIGS. 7D and 7E.

In operation, random motion of the focused radiation will typically result in both radial and azimuthal displacement resulting in both a variation of the separation between data pulses and relative movement between the data pulses and the timing pulses. The radial and azimuthal components of the motion can readily be determined from the frequency and phase information within the train of data pulses by means well known in the art. The analysis of the data pulse from a single slit set yields the relative position of the beam. The analysis of data pulses obtained from successive slit sets yields the direction and amount of beam motion. It is to be recognized that the power level in the beam can be determined from an analysis of the height and width of a data pulse from any slit. It is to be recognized that temporal power fluctuations can be determined from sequential measurement of the data pulses, by means well known in the art, to provide error signals to a feedback loop (not shown) for automatic gain control of a laser device.

Figure 8:
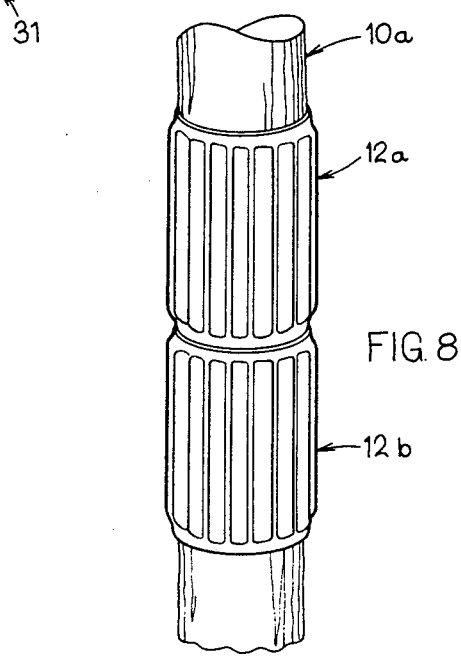
FIG. 8 is a modified and simplified view of a slit set as shown in FIG. 2.

The utilization of the third slit 156 as shown in FIG. 8 allows the focused radiation to be scanned in 0°, 45° and 90° directions, corresponding to the first, third and second slits respectively. As the first slit 150 passes through the focused radiation is appears to scan through the radiation in a first direction which would correspond to a 0° direction. As the second slit 152 passes through the focused radiation, it appears to scan through the radiation in a second direction, which is orthogonal to the first direction and is designated the 90° direction. In a like manner when the third slit 156 passes through the radiation it appears to scan through the radiation in a third direction bisecting the angle between the first and second direction and designated the 45° direction in the embodiment of slits shown in FIG. 8. Since it takes a 0°, 90° and 45° scan through a beam to resolve an arbitrary orientation of astigmatism, the present invention is adapted for resolving astigmatism of the beam. It is to be recognized that the first and second slits may be disposed in a nonorthogonal relationship which would typically result in a decreased sensitivity for the measurement of beam quality.

Figure 9:
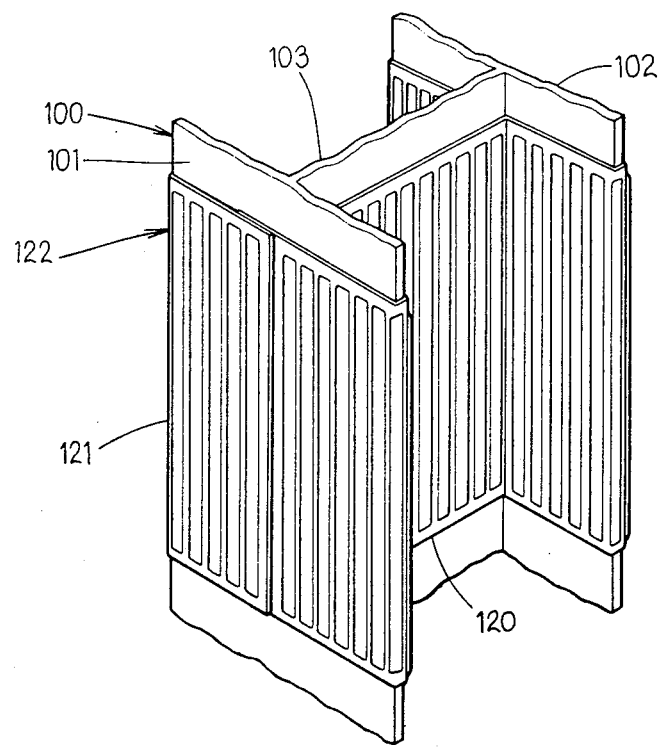
FIG. 9 is a simplified representation of a pulse train obtained utilizing the apparatus as shown in FIG. 8 in accordance with the present invention when exposed to radiation having circular symmetry.

Referring again to FIG. 8 wherein a representative slit set having a first, second and third slit 150, 152 and 156 respectively is shown schematically along with a representation of a beam of radiation focused to a spot having a circular cross section of diameter D. As the disk rotates in the direction of the arrow, the first slit 150 passes through the focus beam producing a first data pulse 182 as shown in FIG. 9 having a pulse width proportional to the width of the slit plus the diameter of the focus spot. As the third slit 156 is rotated through the focus spot, a second data pulse 184 is generated having a pulse width proportional to the width of the slit plus the diameter of the focus spot, which pulse width is typically less than the width of the first data pulse since the effective width of the first slit 150 is greater than the width of the third slit 156 due to the angular placement of the first slit. The separation(s) between data pulses is proportional to the separation(s) between the first and third slits. Similarly, as the second slit 152 passes through the focus diameter, a third data pulse 186 is generated having a pulse height substantially identical to the pulse height of the first and second data pulses and a pulse width substantially identical to the pulse width of the first data pulse. Since the focused radiation has circular symmetry the pulse heights of all three pulses are substantially identical, provided that all three slits have the same width. It is to be recognized that the widths of the slits may be selected to generate substantially equal pulse widths at the expense of having different pulse heights.

Figure 10:
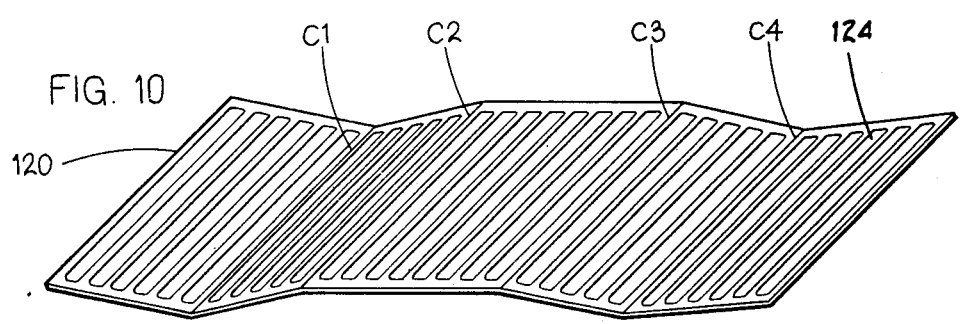
FIG. 10 is a simplified view of the apparatus as shown in FIG. 8 with a beam having a focal zone with an elliptical cross section.
Figure 11:
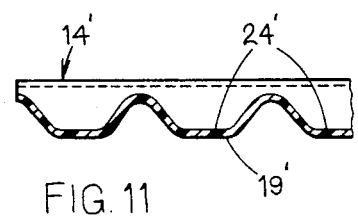
FIG. 11 is a simplified representation of a pulse train obtained in accordance with the present invention from a focus beam having an elliptical cross section as shown in FIG. 10.

The ability of the present invention to measure the direction and magnitude of astigmatism is schematically shown in FIGS. 10 and 11, where radiation is focused to a spot having an elliptical cross section depicting an astigmatic focus spot with a major axis lying in a plane substantially parallel to the orientation of the second slit 152. As the first slit 150 passes through the focus spot, a first data pulse 182 is generated having a height and width proportional to the thickness T of the first slit and the distance D corresponding to the projection of the major axis of the ellipse on the rotation path of the slits. As the third slit 156 rotates through the focus spot, a second data pulse 184 is generated having a width proportional to the width of the slit plus the distance D, wherein the second data pulse has a width less than the width of the first data pulse and a height greater than the height of the first data pulse. As the second slit 152 rotates through the focus spot, a third data pulse 186 is generated having a width proportional to the thickness T of the slit plus the diameter of the minor axis of the elliptical focus spot. The third data pulse has a width which is greater than the width of the first and second pulse and has a pulse height less than the pulse height of the first and second pulse. In like manner a beam having an elliptical cross section with a major axis rotated 90° from the axis as shown in FIG. 10 would produce data pulses wherein the first data pulse has a pulse height greater than the second data pulse which is also greater than the third data pulse. In a similar manner a focus spot having an elliptical shape with a major axis in alignment with the direction of the third slit 156 produces a triplet of data pulses wherein the height of the second data pulse is greater than the height of the first and third data pulses.

The ability of the present invention to monitor defocus of the beam is best illustrated with reference to FIGS. 12 and 13. In the preferred embodiment each triplet group of slit sets includes a first slit set disposed proximate the first surface of the disk, a second slit set disposed proximate the back surface of the disk and a third slit set disposed proximate the central portion of the thickness of the disk as shown in FIGS. 2, 3, 4 and 5.

FIG. 12 shows a simplified schematic of radiation focused through the first, second and third slit sets within the rotating disk 20 of FIG. 1. The radiation is shown passing through the axial position A of the disk representing the location of the leading slit set 80 as shown in FIGS. 2 and 3; the axial position B representing the location of the middle slit set 82 as shown in FIGS. 2 and 4; and the axial position C representing the location of the trailing slit set 84 as shown in FIGS. 2 and 5. FIG. 13(a) shows a pulse train of data pulses produced by the triplet of slit sets 80, 82, 84 for radiation 188 focused at the central axial position B of the disk as shown in FIG. 12, while FIG. 13(b) shows the pulsed train produced by the triplet of slit sets 80, 82, 84 for radiation 190 as shown in FIG. 12 which is focused beyond the axial position C. A comparison of the pulse height data generated by each slit set of the triplet group indicates the direction and amount of defocus of the beam. It is to be recognized that the data obtained from the three axial positions can be utilized to obtain astigmatism measurement when the scanning plane of the disk occurs at the circle of least confusion of the focused beam.

The number of slit sets required to be circumferentially disposed about the disk is a function of the sampling rate required for control and the rotational speed of the disk. The minimum sampling rate is generally recommended to be at least twice the frequency of the signal being monitored. For example it the frequency resulting from jitter is two hundred Hertz, the minimum sample rate would be four hundred samples per second. For a disk having twelve triplet groups, the disk must be rotated at a minimum speed of twelve Hertz although this should be increased by at least a factor of two to overcome aliasing frequency problems. Additionally the rotational speed must be sufficient to minimize signal error due to bearing runout and axial jitter of the disk.

The focus dither of the signal is measured utilizing the variable countersunk slit sets as hereinbefore discussed so that a complete dither cycle consists of a scan at the front surface of the disk, at the back surface of the disk and at an axial position within the disk between the front and back surface, preferably at the center of the disk. In the preferred embodiment the thickness of the disk is chosen to provide for sensing a defocus to an accuracy of approximately 0.1 wavelength at the laser wavelength. Thus twelve triplet groups of slit sets produce twelve dither cycles per disk revolution. With a disk speed of 60 revolutions per second, astigmatism and focus information is gathered at the sampling rate of seven hundred twenty samples per second and jitter information is gathered at the sampling rate of two thousand one hundred sixty samples per second.

It is to be recognized that it is preferable to have the slit sets symmetrically disposed about a radial position on the disk to minimize dynamic balancing problems associated with spinning disks. It is also to be recognized that the present invention may be practiced with a nonsymmetrical distribution of slits within the disk.

In the operation of the present invention for use with radiation having a low signal-to-noise ratio, as for example incoherent radiation emitted from a target having a relatively low temperature, the turning mirror 44 first directs the radiation onto the slit sets within the second ring 26 where the larger slit widths enable more radiation to pass therethrough to provide data pulses having greater amplitude. The data pulses are analyzed as noted hereinbefore to obtain defocus and jitter information. In the preferred embodiment mode of operation, astigmatism is not measured using the inner diameter rings of slit sets. It is to be noted that the utilization of relatively wide slit widths to increase the amount of detected signal from a source results in a decrease in the resolution of the measurement. However, once the initial measurement has been made the turning mirror is rotated to a second position where the radiation is reflected to a ring of slit sets located at a greater radial position than the ring of slit sets utilized in the first measurement and the measurement is repeated. In the preferred embodiment as shown in FIGS. 1 and 2 the radiation is moved from the second ring to the first ring. The narrower slits in the first ring provide greater resolution for the measurement. This dual mode of operation is analogous to the operation of a typical radar apparatus wherein the mode of operation changes from a search mode to a tracking mode. It is to be recognized that the turning mirror 44 must be adapted for providing radiation having the same focal diameter at both the first ring and at the second ring. Additionally, it is to be recognized that the disk 20 may comprise a plurality of rings or slit sets and the turning mirror 44 would be adapted for focussing the radiation 40 onto the slit sets within each of the rings.

In the typical operation of prior art devices adapted for sensing source motion, radiation having a low signal-to-noise ratio required that more light be detected to obtain a data signal having a signal-to-noise ratio sufficient for data reduction purposes. This typically requires that the rotational speed of the disk be adjusted to correlate with the signal-to-noise ratio of the radiation. Changing the rotation speed of the disk is a time-consuming process, especially when reducing the rotation rate, due to the inertia of the disk with respect to change in the rotational speed. For many applications the time required to make the change is unacceptable. The present invention provides means for varying the intensity of the data pulses without varying the rotation speed. As shown in FIG. 2 the slits within the second ring are typically designed to have a slit width larger than the width of the slits in the first ring thereby allowing more radiation to pass therethrough resulting in a data pulse having greater intensity than obtainable from the slits in the first ring, thus alleviating the requirement for reducing the rotational speed of the disk. It is to be recognized that the width of the slits within the second ring may be uniform throughout the thickness of the disk such that the configurations as shown in FIGS. 3, 4 and 5 only apply to the slits within the first ring. In this configuration the slits within the second ring would be utilized to obtain information on beam jitter and perhaps beam astigmatism with beam defocus measurements being made utilizing slit sets within the first ring.

In operation the focused beam of radiation may be moved quickly from one ring of slit sets to another ring of slit sets by rotation of the turning mirror 44 from a first position to a second position. Thus, for radiation having an initially low signal-to-noise ratio the radiation is first directed to the second ring of slit sets where beam jitter information is obtained from the relative separation of the pulses and the relative position of the pulses with respect to timing pulses as disclosed by Cornwell. Beam astigmatism is determined by the relative pulse heights of successive pulses. As the signal-to-noise ratio of the radiation from the source increases or as greater resolution in the measurement of the optical quality of the beam is required, the radiation is quickly directed to the first ring of slit sets by the turning mirror 44 and the measurement of the data continues. In the preferred embodiment the slit sets are located within a disk adapted for rotation. It is to be recognized that the slits may be located in the walls of a cylinder adapted for rotation about its axis with the first and second detectors located therein.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An apparatus for monitoring the defocus, astigmatic errors and jitter of a beam of radiation comprising:

a disk adapted for rotation about a central axis;
means for rotating the disk about the central axis;
a plurality of rings of slit sets radially disposed within the disk symmetrically about the central axis at a plurality of radial positions wherein each ring of slit sets includes a wherein each ring of slit sets includes a multiplicity of triplet groups circumferentially and symmetrically disposed about a circumference of said ring wherein each triplet group comprises a leading slit set, a middle slit set circumferentially positioned adjacent the leading slit set and a trailing slit set circumferentially positioned adjacent the middle slit set and wherein said leading, middle and trailing slit sets are sequentially repeated within each of the triplet groups defining said ring wherein each slit set includes a first slit and a second slit disposed in an angular relationship to the first slit;
means for focusing a beam of radiation through a slit in the slit set;
means for directing a focused beam of radiation from one ring of slit sets to another ring of slit sets;
detector means for sensing the radiation passing through a slit to provide a data signal;
means for providing a synchronization signal; and
means for monitoring the synchronization signal and the data signal to provide output signals proportional to beam quality and the amount and direction of beam motion.

2. The invention in accordance with claim 1 wherein the angular relationship of the first and second slits is a substantially orthogonal relationship.

3. The invention in accordance with claim 1 wherein the plurality of rings of slit sets includes a first ring of slit sets disposed symmetrically about the central axis at a first radial position; and
a second ring of slit sets disposed symmetrically about the central axis at a second radial position wherein the first radial position is located a greater distance from the central axis than the second radial position.

4. The invention in accordance with claim 3 wherein the slit sets within the first ring further includes a third slit symmetrically disposed between the first and second slit bisecting the angle therebetween and superimposed on a radius line passing from the radial position of the first ring of slit sets through the central axis.

5. The invention in accordance with claim 3 wherein the slits forming the first ring of slit sets have a first width and the slits forming the second ring of slit sets have a second width wherein the second width is greater than the first width.

6. The invention in accordance with claim 4 wherein the slit sets in the second ring of slit sets further includes a third slit symmetrically disposed between the first and second slit bisecting the angle therebetween and superimposed on a radius line passing from the radial position of the second ring of slit sets through the central axis.

7. The invention in accordance with claim 1 wherein each slit of the leading slit set is formed between knife edges disposed within the disk proximate a front surface of the disk and each slit of the trailing slit set is formed between knife edges disposed within the disk proximate a back surface of the disk and each slit of the middle set is formed between knife edges disposed within the disk intermediate the front and back surface.

8. The invention in accordance with claim 1 wherein the means for directing the focused beam of radiation from one ring of slit sets to another ring of slit sets is a turning mirror adapted for rotation from a first angular position to a second angular position.

9. The invention in accordance with claim 1 wherein: the detector means for sensing the radiation passing through a slit to provide a data signal includes a first detector positioned proximate a back surface of the disk in line-of-sight optical communication through the slits within the first ring of slit sets with the means for focusing a beam of radiation; and a second detector disposed proximate the back surface of the disk in optical line-of-sight communication through the slit within the second ring of slit sets with the means for focusing a beam of radiation.

10. The invention in accordance with claim 9 wherein the means for providing a synchronization signal includes:

a first synchronization source disposed proximate the front surface of the disk adapted for providing synchronization radiation through a slit within the first ring of slit sets;

a first synchronization detector disposed proximate the back surface of the disk adapted for receiving the synchronization radiation passing through the slit from the first synchronization source to provide a first synchronization signal;

a second synchronization source disposed proximate the front surface of the disk adapted for providing synchronization radiation through a slit within the second ring of slit sets; and a second synchronization detector disposed proximate the back surface of the disk adapted for receiving the synchronization radiation passing through the slit from the second synchronization source to provide a second synchronization signal.

11. The invention in accordance with claim 1 further including an encoder adapted for providing a clock signal to the means for monitoring the synchronization signal and the data signal to provide timing pulses for data reduction.

12. The invention in accordance with claim 6 wherein the slit sets in the second ring of slit sets are located in a triplet group repetitively positioned within the disk to form the second ring of slit sets.

13. The invention in accordance with claim 12 wherein the triplet group of slit sets within the second ring of slit sets includes a leading slit set wherein each slit is formed between knife edged disposed within the disk proximate a front surface of the disk, a trailing slit set wherein each slit is formed between knife edges disposed within the disk proximate a back surface of the disk and a middle slit set wherein each slit is formed between knife edges disposed within the disk intermediate the front and back surface.

* * * * *

UNITED STATES PATENT AND TRADEMARK OFFICE
CERTIFICATE OF CORRECTION

PATENT NO. : 4,245,156
DATED : January 13, 1981
INVENTOR(S) : James E. Harvey, John H. Bluege It is certified that error appears in the above—identified patent and that said Letters Patent is hereby corrected as shown below:

| | |
|---|---|
| Drawings | Sheets 1-3 of U.S. 4,244,156 should be Sheets 1-3 of U.S. 4,245,156 |
| Title | "APPARATUS FOR MONITORING THE OPTICAL QUALITY OF A BEAM RADIATION" should read --APPARATUS FOR MONITORING THE OPTICAL QUALITY OF A BEAM OF RADIATION-- |
| After Abstract | "13 Claims, 18 Drawing Figures" should read --13 Claims, 13 Drawing Figures-- |
| Column 1, line 56 | "porportional" should read --proportional-- |
| Column 2, line 28 | "he" should read --the-- |
| Column 2, line 44 | "radical" should read --radial-- |
| Column 3, line 50 | "adventure" should read --advantage-- |
| Column 5, line 17 | "or" should read --of-- |

UNITED STATES PATENT AND TRADEMARK OFFICE
CERTIFICATE OF CORRECTION

PATENT NO. : 4,245,156
DATED : January 13, 1981
INVENTOR(S) : James E. Harvey; John H. Bluege It is certified that error appears in the above—identified patent and that said Letters Patent is hereby corrected as shown below:

Column 8, line 27     "is" should read --it--

Column 10, line 10    "it" should read --if--

Column 14, line 22    "edged" should read --edges--

Column 12, lines 5-7  "wherein each ring of slit sets includes a wherein each ring of slit sets includes a" should read --wherein each ring of slit sets includes a--

Signed and Sealed this

First Day of December 1981

[SEAL]

Attest:

GERALD J. MOSSINGHOFF

Attesting Officer    Commissioner of Patents and Trademarks